United States Patent
Hauck et al.

(10) Patent No.: US 8,295,302 B2
(45) Date of Patent: *Oct. 23, 2012

(54) METHODS AND APPARATUS FOR ENSURING COMPATIBILITY ON A HIGH PERFORMANCE SERIAL BUS

(75) Inventors: Jerrold V. Hauck, Fremont, CA (US); Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/763,093

(22) Filed: Apr. 19, 2010

(65) Prior Publication Data

US 2010/0202314 A1    Aug. 12, 2010

Related U.S. Application Data

(60) Division of application No. 11/284,674, filed on Nov. 21, 2005, now Pat. No. 7,701,966, which is a continuation of application No. 10/984,535, filed on Nov. 8, 2004, now Pat. No. 7,050,453, which is a continuation of application No. 09/507,120, filed on Feb. 17, 2000, now Pat. No. 6,831,928.

(51) Int. Cl.
*H04J 3/16* (2006.01)

(52) U.S. Cl. ........ 370/465; 370/489; 370/389; 370/400; 710/100

(58) Field of Classification Search ............ 370/392, 370/389, 489, 465, 461, 462, 463, 401, 466, 370/400; 710/100, 105, 311, 315
See application file for complete search history.

(56) References Cited

U.S. PATENT DOCUMENTS

| | | | |
|---|---|---|---|
| 4,156,798 A | 5/1979 | Doelz | |
| 4,194,113 A | 3/1980 | Fulks et al. | |
| 5,014,262 A | 5/1991 | Harshavardhana | |
| 5,274,631 A | 12/1993 | Bhardwaj | |
| 5,282,201 A * | 1/1994 | Frank et al. | 370/403 |
| 5,321,812 A | 6/1994 | Benedict et al. | |
| 5,343,461 A | 8/1994 | Barton et al. | |
| 5,394,555 A * | 2/1995 | Hunter et al. | 711/148 |
| 5,394,556 A | 2/1995 | Oprescu | |
| 5,406,643 A | 4/1995 | Burke et al. | |
| 5,452,330 A | 9/1995 | Goldstein | |
| 5,490,250 A | 2/1996 | Reschke et al. | |
| 5,490,253 A | 2/1996 | Laha et al. | |
| 5,493,568 A | 2/1996 | Sampat et al. | |
| 5,495,481 A | 2/1996 | Duckwall | |
| 5,524,254 A | 6/1996 | Morgan et al. | |
| 5,539,390 A | 7/1996 | Nagano et al. | |
| 5,541,670 A | 7/1996 | Hanai | |
| 5,568,487 A | 10/1996 | Sitbon et al. | |
| 5,568,641 A | 10/1996 | Nelson et al. | |
| 5,583,922 A | 12/1996 | Davis et al. | |
| 5,621,659 A | 4/1997 | Matsumoto et al. | |
| 5,630,173 A | 5/1997 | Oprescu | |
| 5,632,016 A | 5/1997 | Hoch et al. | |

(Continued)

*Primary Examiner* — Ajit Patel
(74) *Attorney, Agent, or Firm* — Gazdzinski & Associates, PC

(57) ABSTRACT

A data communications system is disclosed having at least one Legacy cloud coupled to at least one Beta cloud. The system further having at least one BOSS node and at least one border node. A method for ensuring compatibility is disclosed comprising determining when the BOSS node is idle, determining whether the last packet transmitted by any border node was an Alpha format packet if the BOSS node is idle, and unlocking the Legacy cloud if the last packet transmitted by the border node was not an Alpha format packet.

28 Claims, 9 Drawing Sheets

Figure 1:
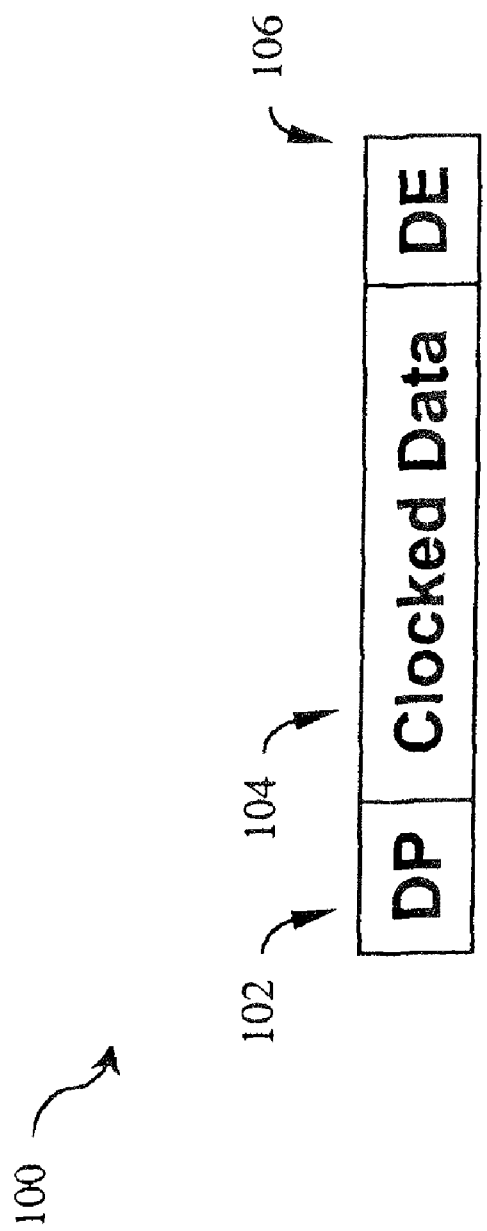

Locking and Maintaining Lock Status by a Border Node
According to the Present Invention

U.S. PATENT DOCUMENTS

| | | | |
|---|---|---|---|
| 5,640,595 A | 6/1997 | Baugher et al. |
| 5,642,515 A | 6/1997 | Jones et al. |
| 5,654,657 A | 8/1997 | Pearce |
| 5,684,715 A | 11/1997 | Palmer |
| 5,701,476 A | 12/1997 | Fenger |
| 5,701,492 A | 12/1997 | Wadsworth et al. |
| 5,706,278 A | 1/1998 | Robillard et al. |
| 5,712,834 A | 1/1998 | Nagano et al. |
| 5,719,862 A | 2/1998 | Lee et al. |
| 5,754,765 A | 5/1998 | Danneels et al. |
| 5,764,930 A | 6/1998 | Staats |
| 5,784,648 A | 7/1998 | Duckwall |
| 5,802,048 A | 9/1998 | Duckwall |
| 5,802,057 A | 9/1998 | Duckwall et al. |
| 5,802,365 A | 9/1998 | Kathail et al. |
| 5,805,073 A | 9/1998 | Nagano et al. |
| 5,805,822 A | 9/1998 | Long et al. |
| 5,809,331 A | 9/1998 | Staats et al. |
| 5,819,115 A | 10/1998 | Hoese et al. |
| 5,826,027 A | 10/1998 | Pedersen et al. |
| 5,832,298 A | 11/1998 | Sanchez et al. |
| 5,835,761 A | 11/1998 | Ishii et al. |
| 5,845,152 A | 12/1998 | Anderson et al. |
| 5,867,730 A | 2/1999 | Leyda |
| 5,875,301 A | 2/1999 | Duckwall et al. |
| 5,923,663 A | 7/1999 | Bontemps et al. |
| 5,930,480 A | 7/1999 | Staats |
| 5,935,208 A | 8/1999 | Duckwall et al. |
| 5,938,764 A | 8/1999 | Klein |
| 5,940,600 A | 8/1999 | Staats et al. |
| 5,954,796 A | 9/1999 | McCarty et al. |
| 5,968,152 A | 10/1999 | Staats |
| 5,970,052 A | 10/1999 | Lo et al. |
| 5,987,506 A * | 11/1999 | Carter et al. .................. 709/213 |
| 5,987,605 A | 11/1999 | Hill et al. |
| 5,991,842 A | 11/1999 | Takayama |
| 6,006,275 A | 12/1999 | Picazo, Jr. et al. |
| 6,009,480 A | 12/1999 | Pleso |
| 6,032,202 A | 2/2000 | Lea et al. |
| 6,032,261 A | 2/2000 | Hulyalkar |
| 6,038,234 A | 3/2000 | LaFollette et al. |
| 6,038,625 A | 3/2000 | Ogino et al. |
| 6,041,286 A | 3/2000 | White |
| 6,070,187 A | 5/2000 | Subramaniam et al. |
| 6,073,206 A | 6/2000 | Piwonka et al. |
| 6,091,726 A | 7/2000 | Crivellari et al. |
| 6,115,764 A | 9/2000 | Chisholm et al. |
| 6,122,248 A | 9/2000 | Murakoshi et al. |
| 6,131,129 A | 10/2000 | Ludtke et al. |
| 6,131,134 A | 10/2000 | Huang et al. |
| 6,131,163 A | 10/2000 | Wiegel |
| 6,133,938 A | 10/2000 | James |
| 6,138,163 A | 10/2000 | Nam et al. |
| 6,138,196 A | 10/2000 | Takayama et al. |
| 6,141,702 A | 10/2000 | Ludtke et al. |
| 6,141,767 A | 10/2000 | Hu et al. |
| 6,145,018 A | 11/2000 | LaFollette et al. |
| 6,157,972 A | 12/2000 | Newman et al. |
| 6,160,796 A | 12/2000 | Zou |
| 6,167,532 A | 12/2000 | Wisecup |
| 6,173,327 B1 | 1/2001 | De Borst et al. |
| 6,185,622 B1 | 2/2001 | Sato |
| 6,188,700 B1 | 2/2001 | Kato et al. |
| 6,192,189 B1 | 2/2001 | Fujinami et al. |
| 6,199,119 B1 | 3/2001 | Duckwall et al. |
| 6,202,210 B1 | 3/2001 | Ludtke |
| 6,212,171 B1 | 4/2001 | LaFollette et al. |
| 6,212,633 B1 | 4/2001 | Levy et al. |
| 6,219,697 B1 | 4/2001 | Lawande et al. |
| 6,226,680 B1 | 5/2001 | Boucher et al. |
| 6,233,615 B1 | 5/2001 | Van Loo |
| 6,233,624 B1 | 5/2001 | Hyder et al. |
| 6,243,778 B1 | 6/2001 | Fung et al. |
| 6,247,063 B1 | 6/2001 | Ichimi et al. |
| 6,247,083 B1 | 6/2001 | Hake et al. |
| 6,253,114 B1 | 6/2001 | Takihara |
| 6,253,255 B1 | 6/2001 | Hyder et al. |
| 6,256,059 B1 | 7/2001 | Fichtner |
| 6,260,063 B1 | 7/2001 | Ludtke et al. |
| 6,266,334 B1 | 7/2001 | Duckwall |
| 6,266,344 B1 | 7/2001 | Fujimori et al. |
| 6,266,701 B1 | 7/2001 | Sridhar et al. |
| 6,275,889 B1 | 8/2001 | Saito |
| 6,278,838 B1 | 8/2001 | Mendenhall et al. |
| 6,282,597 B1 | 8/2001 | Kawamura |
| 6,292,840 B1 | 9/2001 | Blomfield Brown et al. |
| 6,295,479 B1 | 9/2001 | Shima et al. |
| 6,298,057 B1 | 10/2001 | Guy et al. |
| 6,308,222 B1 | 10/2001 | Krueger et al. |
| 6,311,228 B1 | 10/2001 | Ray |
| 6,314,461 B2 | 11/2001 | Duckwall et al. |
| 6,343,321 B2 | 1/2002 | Patki et al. |
| 6,345,315 B1 | 2/2002 | Mishra |
| 6,347,362 B1 | 2/2002 | Schoinas et al. |
| 6,353,868 B1 | 3/2002 | Takayama et al. |
| 6,356,558 B1 | 3/2002 | Hauck et al. |
| 6,363,085 B1 | 3/2002 | Samuels |
| 6,373,821 B2 | 4/2002 | Staats |
| 6,385,679 B1 | 5/2002 | Duckwall et al. |
| 6,405,247 B1 | 6/2002 | Lawande et al. |
| 6,411,628 B1 | 6/2002 | Hauck et al. |
| 6,418,150 B1 | 7/2002 | Staats |
| 6,425,019 B1 | 7/2002 | Tateyama et al. |
| 6,426,962 B1 | 7/2002 | Cabezas et al. |
| 6,442,630 B1 | 8/2002 | Takayama et al. |
| 6,445,711 B1 | 9/2002 | Scheel et al. |
| 6,446,116 B1 | 9/2002 | Burridge |
| 6,446,142 B1 | 9/2002 | Shima et al. |
| 6,452,975 B1 | 9/2002 | Hannah |
| 6,457,086 B1 | 9/2002 | Duckwall |
| 6,466,982 B1 | 10/2002 | Ruberg |
| 6,496,862 B1 | 12/2002 | Akatsu et al. |
| 6,502,144 B1 | 12/2002 | Accarie |
| 6,513,085 B1 | 1/2003 | Gugel et al. |
| 6,516,465 B1 | 2/2003 | Paskins |
| 6,519,657 B1 | 2/2003 | Stone et al. |
| 6,529,522 B1 | 3/2003 | Ito et al. |
| 6,574,588 B1 | 6/2003 | Shapiro et al. |
| 6,580,694 B1 | 6/2003 | Baker |
| 6,587,904 B1 | 7/2003 | Hauck et al. |
| 6,591,300 B1 | 7/2003 | Yurkovic |
| 6,606,320 B1 | 8/2003 | Nomura et al. |
| 6,618,750 B1 | 9/2003 | Staats |
| 6,618,764 B1 | 9/2003 | Shteyn |
| 6,618,785 B1 | 9/2003 | Whitby Streves |
| 6,621,832 B2 | 9/2003 | Staats |
| 6,628,607 B1 | 9/2003 | Hauck et al. |
| 6,631,426 B1 | 10/2003 | Staats |
| 6,636,914 B1 | 10/2003 | Teener |
| 6,639,918 B1 | 10/2003 | Hauck et al. |
| 6,643,714 B1 | 11/2003 | Chrysanthakopoulos |
| 6,671,768 B1 | 12/2003 | Brown |
| 6,686,838 B1 | 2/2004 | Rezvani et al. |
| 6,691,096 B1 | 2/2004 | Staats |
| 6,700,895 B1 | 3/2004 | Kroll |
| 6,711,574 B1 | 3/2004 | Todd et al. |
| 6,718,497 B1 | 4/2004 | Whitby-Strevens |
| 6,763,175 B1 | 7/2004 | Trottier et al. |
| 6,813,663 B1 | 11/2004 | Brown |
| 7,490,174 B2 | 2/2009 | Hauck et al. |
| 2001/0001151 A1 | 5/2001 | Duckwall et al. |
| 2001/0019561 A1 | 9/2001 | Staats |
| 2001/0024423 A1 | 9/2001 | Duckwall et al. |
| 2002/0057655 A1 | 5/2002 | Staats |
| 2002/0085581 A1 | 7/2002 | Hauck et al. |
| 2002/0101231 A1 | 8/2002 | Staats |
| 2002/0101885 A1 | 8/2002 | Pogrebinsky et al. |
| 2002/0103947 A1 | 8/2002 | Duckwall et al. |
| 2002/0172226 A1 | 11/2002 | Staats |
| 2002/0188780 A1 | 12/2002 | Duckwall |
| 2002/0188783 A1 | 12/2002 | Duckwall et al. |
| 2003/0037161 A1 | 2/2003 | Duckwall et al. |
| 2003/0055999 A1 | 3/2003 | Duckwall et al. |
| 2003/0056672 A1 | 3/2003 | Ueda et al. |
| 2004/0037309 A1 | 2/2004 | Hauck et al. |
| 2006/0020729 A1 | 1/2006 | Nakamura et al. |

* cited by examiner

Alpha Format Packet

Legacy Compatibility Example

Legacy Speed Filtering Example

P1394b Packet Format

Data Communications System Having both
P1394b and Legacy Devices

Managing Legacy Devices by a Border Node
According to the Present Invention

Unlocking Legacy Devices by a BOSS Node According to the Present Invention

Locking and Maintaining Lock Status by a Border Node
According to the Present Invention Speed Filtering Beta Devices
According to the Present Invention

METHODS AND APPARATUS FOR ENSURING COMPATIBILITY ON A HIGH PERFORMANCE SERIAL BUS

PRIORITY AND CROSS-REFERENCE TO RELATED APPLICATIONS

This application is a divisional of and claims priority to co-owned and co-pending U.S. patent application Ser. No. 11/284,674, of the same title, filed Nov. 21, 2005, which is a continuation of and claims priority to co-owned U.S. patent application Ser. No. 10/984,535, of the same title, filed Nov. 8, 2004, now issued as U.S. Pat. No. 7,050,453, and which is a continuation of and claims priority to co-owned U.S. patent application Ser. No. 09/507,120, of the same title, filed Feb. 17, 2000, which issued as U.S. Pat. No. 6,831,928, each of the foregoing incorporated herein by reference in its entirety.

BACKGROUND OF THE INVENTION

1. Field of the Invention

The present invention relates to data communications. In particular, the present invention relates to ensuring compatibility on a high performance serial bus system.

2. The Prior Art

Background

Modern electronic equipment has greatly enhanced the quality of our lives. However, as the use of such equipment has increased, so has the need to connect equipment purchased from different manufacturers. For example, while a computer and a digital camera may each be useful when used alone, the ability to connect the digital camera to the computer and exchange information between the two makes the combination even more useful. Therefore, a need was apparent for a serial bus standard that would allow for the connection and communication between such devices.

The IEEE 1394-1995 standard was developed to satisfy this need. This standard revolutionized the consumer electronics industry by providing a serial bus management system that featured high speeds and the ability to "hot" connect equipment to the bus; that is, the ability to connect equipment without first turning off the existing connected equipment. Since its adoption, the IEEE 1394-1995 standard has begun to see acceptance in the marketplace with many major electronics and computer manufacturers providing IEEE 1394-1995 connections on equipment that they sell.

However, as technologies improved, the need to update the IEEE 1394-1995 standard became apparent. Two new standards are being proposed at the time of the filing of this application, herein referred to as the proposed IEEE 1394a, or P1394a standard, and the proposed IEEE 1394b, or P1394b standard. Improvements such as higher speeds and longer connection paths will be provided.

In the discussion that follows, it will be necessary to distinguish between the various standards that are being proposed as of the date of this application. Additionally, it will be necessary to distinguish hardware and packet transmissions that are compatible with the P1394b standard and not earlier standards.

Thus, the term "Legacy" will be used herein to refer to the IEEE 1394-1995 standard and all supplements thereof prior to the P1394b standard. Thus, for example, a Legacy node refers to a node compatible with the IEEE 1394-1995 standard and all supplements thereof up to, but not including, the P1394b standard.

Additionally, packets of data will be referred to herein depending on the context the packets are in. For example, a packet of data that is compatible with the P1394b standard and is traveling through a PITY compatible with the P1394b standard will be referred to as Beta format packets. Packets of data that are compatible with the Legacy standard but are traveling through a PHY compatible with the P1394b standard will be referred to as Legacy packets. Finally, packets of data that are compatible with the Legacy format and are traveling across a data strobe link will be referred to as Alpha format packets.

Furthermore, in the discussion that follows PHYs that are compatible with the P1394b standard may be referred to in various ways, depending upon the context the PHY is operating in and the capability of the PHY. For example, a PHY that has circuitry compatible with the P1394b standard but not any previous standards will be referred to as a B only PHY. Also, a PHY that is compatible with both the P1394b standard and all predecessors and is communicating with only devices compatible with the P1394b standard will be referred to as B PHYs. Finally, a PHY that is communicating with both Legacy devices and devices compatible with the P1394b standard will be referred to as a border device, border PHY, or border node.

Finally, a communications system that has only B PHYs attached will be referred to as a B bus.

Data Transmission in Legacy Systems

One area that has been improved in the P1394b standard is in the way that data transmission takes place on the bus.

FIG. 1 is a prior art example of a Alpha format data packet 100 according to Legacy specifications. In the IEEE 1394-1995 standard, a data packet will begin with the transmission of a Data Prefix ("DP") identifier, shown as DP 102 in FIG. 1. Importantly, in the IEEE 1394-1995 standard, a DP must have a duration of no less than 140 nanoseconds (ns), though a DP may be of any greater length.

Typically, a DP is followed by the transmission of clocked data, known as the payload, shown as clocked data 104 in FIG. 1. On a Legacy bus, the payload will be clocked at a rate of 100 Megabits per second (Mb/s), 200 Mb/s, or 400 Mb/s. These data rates are known as S100, S200, and S400, respectively.

Finally, the payload is followed by a Data End ("DE"), shown as DE 106 in FIG. 1. In the IEEE 1394-1995 standard, a DE must be at least 240 ns in length.

As is appreciated by one of ordinary skill in the art, the Legacy specifications thus a timer-based system, where data transmission begins and ends according to a fixed timer.

Compatibility Issues in Legacy Systems

As mentioned above, there are three clocked data rates present in Legacy systems, S100, S200, and S400. Initially, when the IEEE 1394-1995 standard was introduced, devices could only communicate at the S100 rate. Later, devices were introduced that communicated at the S200 and S400 rates.

One problem that occurred in the prior art was how to insure compatibility between the various devices on the market that were communicating at these different rates.

Figure 2:
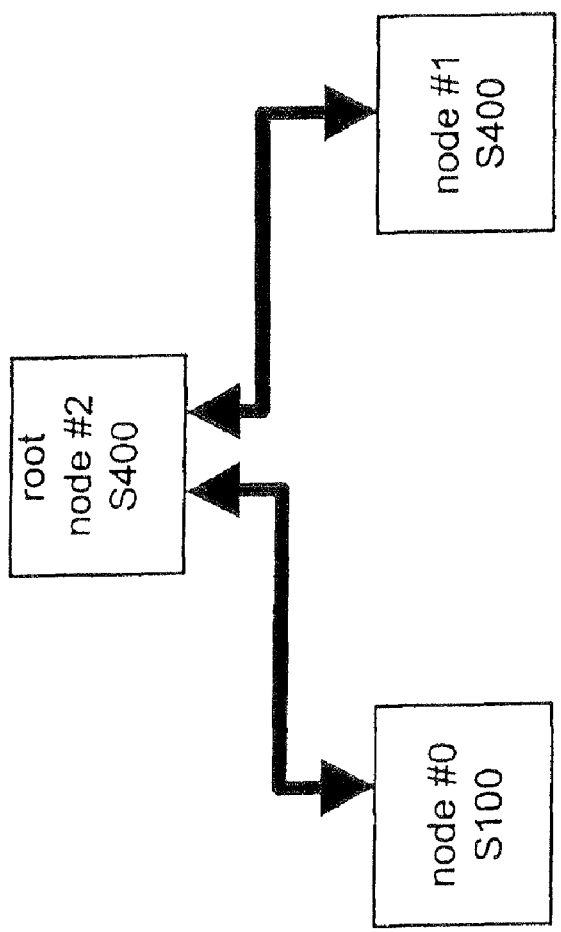

FIG. 2 illustrates such a compatibility problem. FIG. 2 has three nodes, nodes #0, #1, and #2. Node #2, the root node in this example, wishes to communicate with node #1. As is indicated in FIG. 2, nodes #1 and #2 are capable of communicating at the S400 data rate, while node #0 is only capable of communication at the lower S100 rate.

Figure 3:
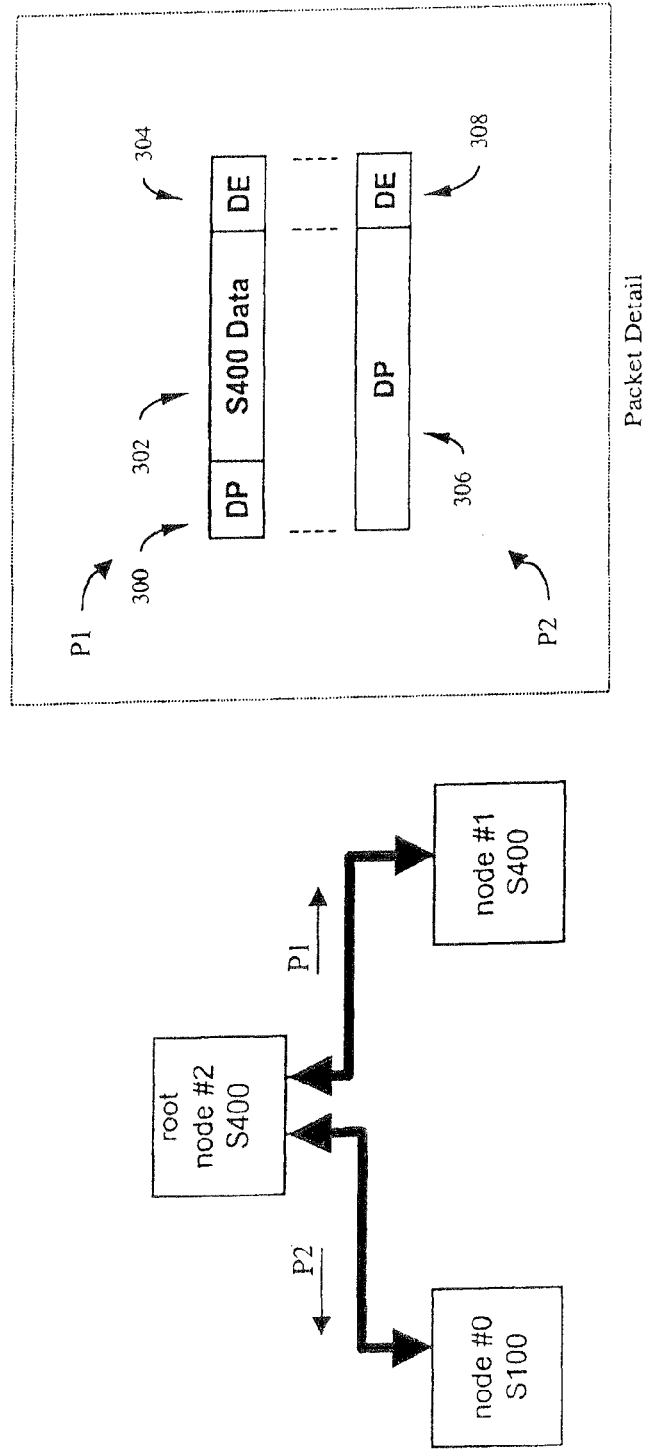

FIG. 3 illustrates the prior art solution of speed filtering on a Legacy bus. FIG. 3 shows root node #2 transmitting S400 data in packet P1 to node #1. In the prior art, to prevent node #0 from receiving the S400 data that it cannot understand, it is "shielded" from such data by having root node #2 transmit a null packet P2 to it.

In the FIG. 3 Packet Detail illustration, packets P1 and P2 are shown together on a common time axis. Packet P1 comprises a DP 300, S400 data 302, and a DE 304. Null packet P2 comprises a DP 306, and a DE 308. As is appreciated by one of ordinary skill in the art, the null packet accomplishes its shielding by extending the DP for the amount of time required to send S400 data 302. As is known by those of ordinary skill in the art, on a Legacy bus all nodes must remain synchronized in their interpretation of idle time. Thus, the null packet effectively 'busies' node #0 while root node #2 transmits S400 data to node #1 and thus shields node #0 from speeds it cannot understand.

Data Transmission in P1394b

Figure 4:
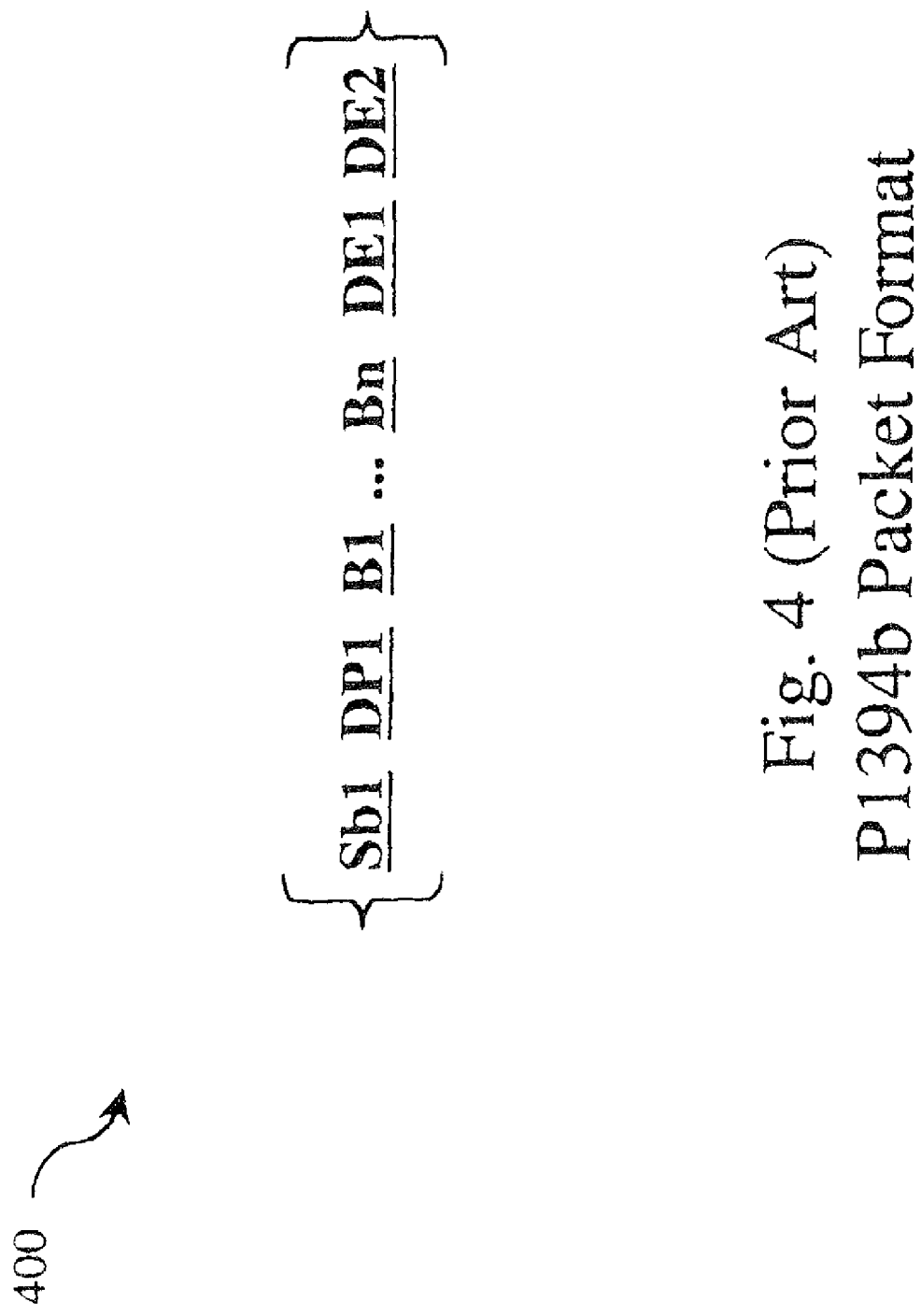

FIG. 4 is a representation of the prior art data packet structure according to the P1394b standard. As is known by those of ordinary skill in the art, P1394b utilizes a packet structure that is scaled to speed unlike the fixed timer system utilized in Legacy standard. Specifically, the packet structure in P1394b is based upon symbols, rather than the fixed intervals found in the Legacy standard.

In FIG. 4, a typical prior art packet 400 of P1394b data is shown. As is known by those of ordinary skill in the art, a data packet begins in P1394b with the transmission of at least two packet starting symbols. In this example, a Speed Code symbol Sb1 and a Data Prefix symbol DP1 are shown as the packet starting symbols. Then, P1394b data bytes B1 through Bn are transmitted. Data bytes B1 through Bn may be referred to herein as the payload. Finally, the transmission of data is terminated by transmitting DE symbols DE1 and DE2.

Compatibility Problems Between P1394b and Legacy Nodes and Clouds

Figure 5:
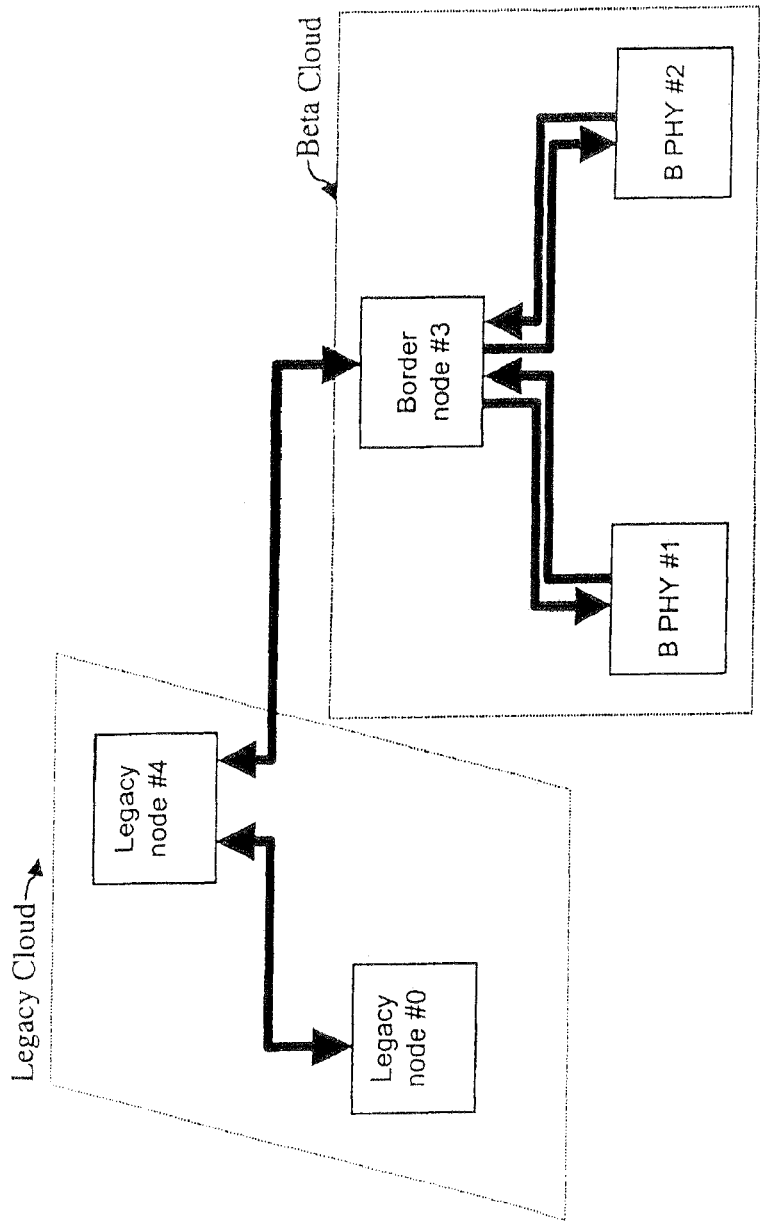

FIG. 5 shows a data communications system comprising both P1394b and Legacy devices. This type of system will be referred to herein as a "hybrid" system. FIG. 5 shows a Legacy node #0 connected to Legacy node #4, forming what is known as a "Legacy cloud" of Legacy nodes.

Legacy node #4 is connected to border node #3. Border node #3 is connected to B PHYs #1 and #2, forming what is known as a "Beta cloud" of border and B PHYs.

As mentioned above, the data prefix in IEEE 1394-1995 is at least 140 ns in length, and the data end is 240 ns. Therefore, the smallest Legacy packet, including the mandatory idle time that must follow, is at least 400 ns in length. As is appreciated by those of ordinary skill in the art, the problem of compatibility arises because this amount of time can be greater than an entire data packet in P1394b.

Therefore, in order for Beta devices to communicate with each other, any Legacy devices must at the same time be protected from receiving Beta packets. As can be seen from FIG. 5, this protection must be accomplished by the border node, since it is the node connecting the Legacy and Beta clouds together.

Currently, there is no provision for allowing a Beta cloud to communicate within itself while connected to a Legacy cloud.

Therefore, there is a need for a protocol that allows a border node to manage Legacy nodes while communication with a Beta cloud occurs and does not affect the delivery of Alpha format or Legacy packets.

Finally, there is a corollary need for a protocol to speed filter slower beta devices from higher speed packets within a beta cloud.

BRIEF DESCRIPTION OF THE INVENTION

The invention satisfies the above needs. The present invention relates to a method and apparatus for ensuring compatibility in a high performance serial bus.

A method for ensuring compatibility is disclosed, comprising: waiting until the border node receives a packet; issuing a data prefix packet by the border node into the Legacy cloud when the border node receives a packet; determining whether the border node has received or transmitted a Legacy packet; and appending the Legacy packet onto the end of the data prefix and transmitting the Legacy format packet into the Legacy cloud if the border node has received or transmitted a Legacy packet.

A method for ensuring compatibility is disclosed, comprising: determining when the BOSS node is idle; determining whether the last packet transmitted by any border node was an Alpha format packet if the BOSS node is idle; and unlocking the Legacy cloud if the last packet transmitted by the border node was not an Alpha format packet.

A method for ensuring compatibility is disclosed, comprising: determining whether the last packet transmitted or received by the border node was an Alpha format packet; arbitrating for control of the bus if the last packet transmitted or received by the border node was not an Alpha format packet; determining whether border node's arbitration request was granted; repeating last packet received if the arbitration request was not granted and returning back to the step of determining whether the last packet transmitted or received by the border node was an Alpha format packet; and unlocking the Legacy cloud if the arbitration request was granted.

A method for ensuring compatibility is disclosed, comprising: determining whether the B PHY desires to communicate at a speed on a bus having a peer device not capable of communicating at the speed; and speed filtering the peer device if the B PHY determines that the peer device cannot communicate at the speed.

Various data packets and methods for transmitting data packets are also disclosed to satisfy the needs discussed herein.

BRIEF DESCRIPTION OF THE DRAWING FIGURES

Figure 6:
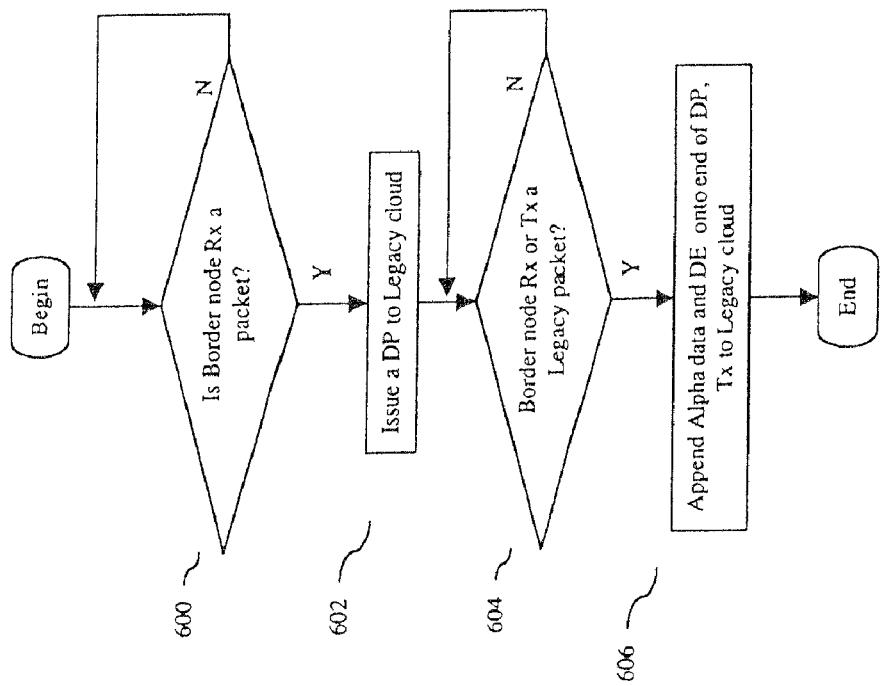
Figure 7:
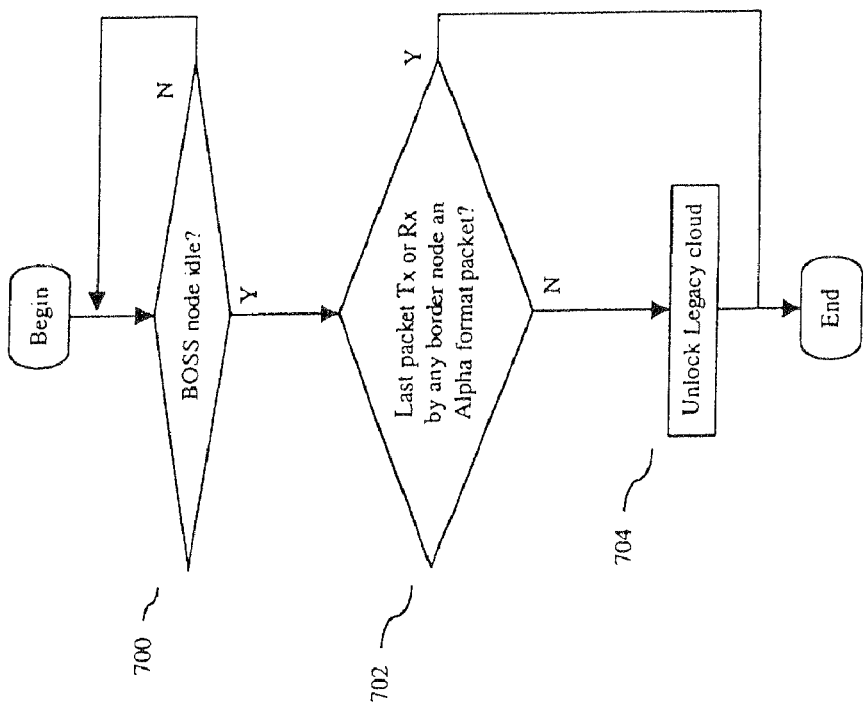
Figure 8:
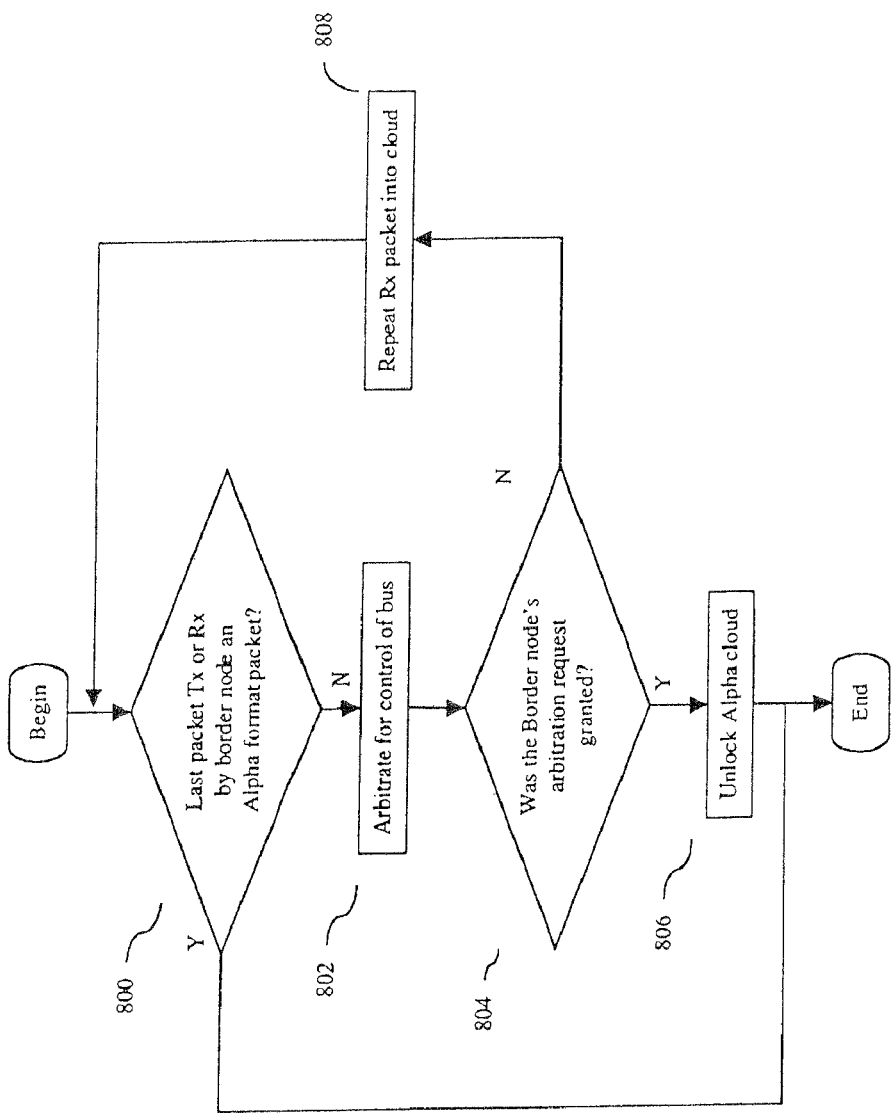
Figure 9:
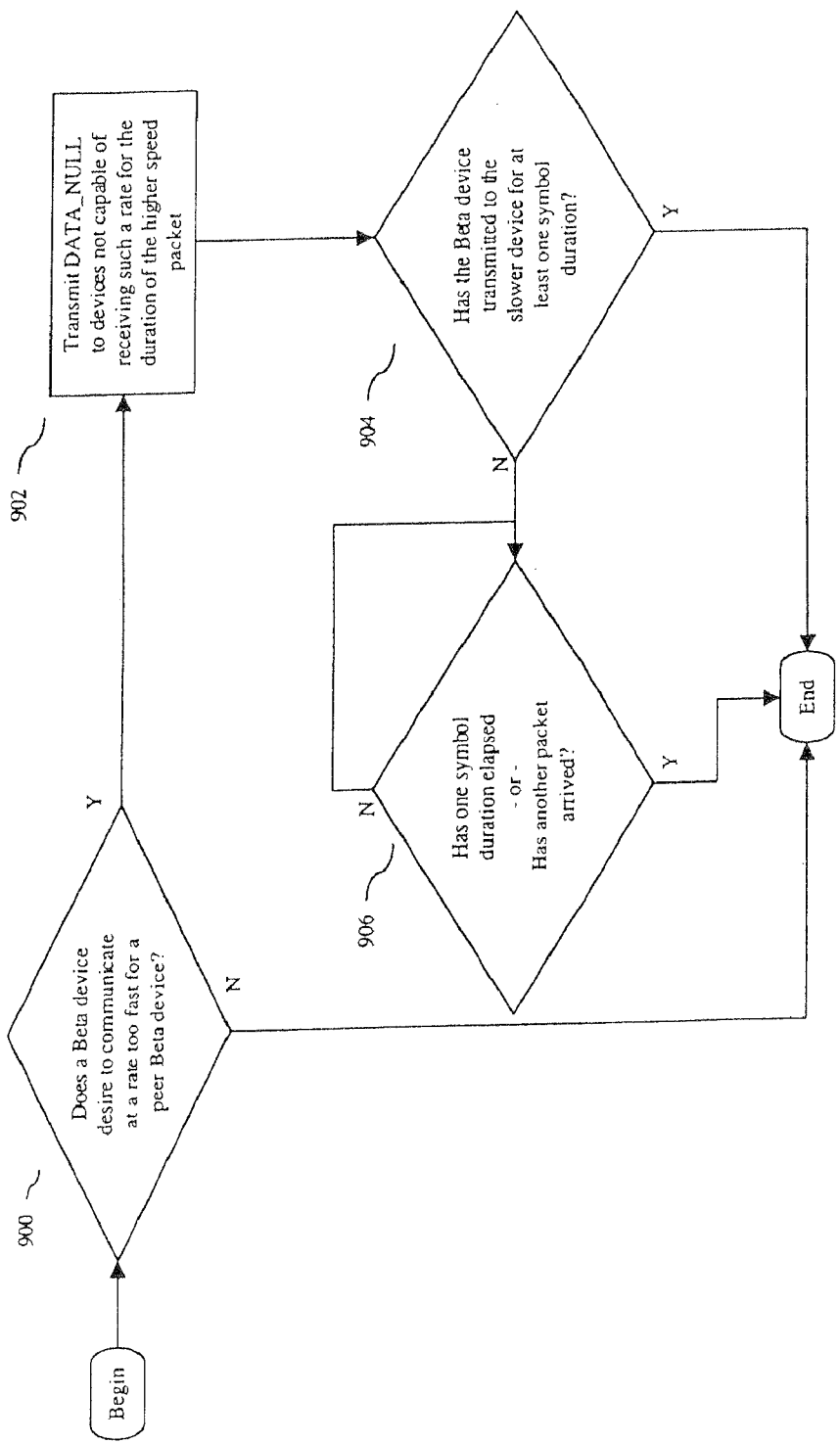

FIG. 1 is a prior art Alpha Format Packet example.
FIG. 2 is a prior art Legacy Compatibility example.
FIG. 3 is a prior art Legacy Speed Filtering example.
FIG. 4 is a prior art P1394b Packet format example.
FIG. 5 is a prior art Data Communications System having both P1394b and Legacy devices.
FIG. 6 Is A Flowchart For Managing Legacy Devices By A Border Node According To The Present Invention.
FIG. 7 Is A Flowchart For Unlocking Legacy Devices By A BOSS Node According To The Present Invention.
FIG. 8 Is A Flowchart For Locking And Maintaining Lock Status By A Border Node According To The Present Invention.
FIG. 9 Is A Flowchart For Speed Filtering. Beta Devices According To The Present Invention.

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

The present invention relates to data communications. More particularly, the present invention relates to a method and apparatus for an arbitration and fairness protocol on a serial bus. The invention further relates to machine readable media on which are stored embodiments of the present invention. It is contemplated that any media suitable for retrieving instructions is within the scope of the present invention. By way of example, such media may take the faun of magnetic, optical, or semiconductor media.

The present invention relates to data structures and the transmission of such data structures. It is contemplated that the present invention may be embodied in various computer and machine readable data structure. Furthermore, it is contemplated that data structures embodying the present invention will be transmitted across computer and machine readable media.

The present invention may be described through the use of flowcharts. Often, a single instance of an embodiment of the present invention will be shown. As is appreciated by those of ordinary skill in the art, however, the protocols and procedures described herein may be repeated continuously or as often as necessary to satisfy the needs described herein. Accordingly, the representation of the present invention through the use of flowcharts should not be used to limit the scope of the present invention.

The present invention further relates to devices that embody the P1394b standard. By way of example, such devices may include those typically used in an audio/video entertainment system, such as home theater receivers, DVD players, computers, or hand-held devices such as cameras and the like. The devices may also include those industrial in nature, such as test and measurement equipment, professional audio/video recording devices, as well as system control or robotic devices found in an industrial environment.

The invention also relates to nodes and physical computers, such as state machines. The present invention may be embodied in any collection of nodes linked together through a bus. Typically, each device connected to the bus will also have one corresponding node physical layer controller embedded therein. However, a given device may have more than one node, and therefore it follows that one device may have more than one connection to more than one bus. For the discussion that follows, the examples will show the typical situation were one node corresponds to one device.

Each node may communicate to other nodes in an P1394b-compatible system though links. Typically, a cable is used for a link, as is provided for in the P1394b standard. However, any communication means may be employed. By way of example, an infrared, RF, or other wireless system may be used, as well as an optical system.

Typically, a link is coupled to a node through a port. A port transmits and receives messages and data between the node and link. As is known by those of ordinary skill in the art, each node may have more than one port.

Border Node Behavior

FIG. 6 is a flowchart of one embodiment of the present invention. The process begins with query 600. In query 600, the border node listens for a data packet. If there is no data packet received, the border node loops, waiting for a data packet.

When the border node receives a data packet, it then sends a DP indication to the Legacy cloud in act 602. This will "lock up" the Legacy cloud. Now that the Legacy cloud is locked up, devices may transmit P1394b data within the Beta cloud without affecting the Legacy cloud.

Referring still to FIG. 6, the border node will wait to receive or transmit a Legacy packet to appear, as shown in query 604. When a Legacy packet appears, the border node will append the Legacy data onto the existing DP along with a DE, and transmit the packet to the Legacy cloud in act 606, thus unlocking the Legacy cloud.

FIG. 7 is a flowchart of another preferred embodiment of the present invention. In FIG. 7, the BOSS node will determine whether it is idle in query 700. When the BOSS node becomes idle, it will then determine whether the last packet transmitted or received by any border node was an Alpha format packet in query 702. It is contemplated that this determination may be done by any means. For example if a B PHY is BOSS and it last sent a Beta format packet, then it knows that packet transmitted or received by a border node was not an Alpha format packet.

If the was determined in query 702 that the last packet transmitted or received by any border node was not an Alpha format packet, the border node will then unlock the Legacy cloud in act 704. It is contemplated that various means may be used to unlock a Legacy cloud. By way of a non-limiting example, in one preferred embodiment, the Legacy cloud is unlocked by having the BOSS node transmit a null packet to the Legacy cloud. However, any means for unlocking a Legacy cloud is within the scope of the present invention.

FIG. 8 is a flowchart for locking and maintaining lock status by a border node according to the present invention. The process begins in query 800 by the border node determining whether the last packet transmitted or received by the border node was an Alpha format packet. If the border node last transmitted or received an Alpha format packet, the process ends.

Referring still to query 800 of FIG. 8, if the last packet transmitted by the border node was not an Alpha format packet, then the Legacy cloud is still locked up. The border node will first arbitrate for control of the bus in act 802.

The border node will then determine whether its arbitration request was granted in query 804. If it was, then the border node will then unlock the Legacy cloud in act 806. As mentioned above, there are many ways to unlock a Legacy cloud. By way of a non-limiting example, in one preferred embodiment, the Legacy cloud is unlocked by having the border node transmitting a null packet to the Legacy cloud. However, any means for unlocking a Legacy cloud is within the scope of the present invention.

If the border node's arbitration request was not granted in query 804, then the border node will repeat the received packet into the cloud in act 808, and the process will return the beginning in query 800.

Speed Filtering in P1394b

The present invention defines a new P1394b symbol known as a DATA_NULL. When a beta packet is to be sent out at a speed that is greater than the port speed of a peer device such as a receiving beta node, then a DATA_NULL will be sent to that node instead as method of speed filtering.

In a preferred embodiment of the present invention, the DATA_NULL is defined such that the node is left in the arbitration request phase, which allows DATA_NULL symbol<s> to be deleted if necessary, but caution is taken to ensure that at least one symbol is seen by the slower device such that bus timers are reset. This would occur, by way of example, if the high speed packet is very fast compared to the speed of the speed filtered device. If the speed is such that the DATA_NULL symbol is less than one symbol duration, then the filtered device will not see the DATA_NULL symbol. But if it does get seen by the filtered device, then this signifies that the bus is occupied, and the bus timers should be reset. <Comma, will-would>

In another preferred embodiment of the present invention, the result of the above process is such that the filtered device is held in an arbitration request phase until the Beta device is finished communicating.

Furthermore, unlike the Legacy speed filtering method above in the prior art section above, the present invention allows to the speed filtering duration to be scalable to symbols, and is therefore not subject to the Legacy 400 ns packet time.

Also, the DATA_NULL symbol can be used as a DENY indication within the beta cloud. This use also has the advantage of not committing the cloud to a Legacy packet until necessary.

Thus, when used as a DENY indication, a node receiving the DATA_NULL will repeat it out of all ports at the appropriate speeds. If a Legacy packet is eventually sourced, then the accompanying DP will alert the beta nodes and the process described above in the border node discussion will take place.

If the packet turns out to be a beta packet, then the node will repeat the packet to only those beta nodes capable of receiving a beta packet of that speed.

FIG. 9 is a flowchart of speed filtering Beta devices. In query 900, a B PHY will determine whether it desires to communicate on a bus where there are peer Beta devices that are not capable a communicating at such a speed. If there is, then the DATA_NULL will be repeated to devices not capable a receiving a packet of such speed by the B PHY in act 902.

When a border node receives a DATA_NULL packet, it will issue a DP into the Legacy cloud in accordance with the border node protocol as described above.

<Set Timers, Calculate Math>

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

The invention claimed is:

1. A method for ensuring compatibility in a data communications
system between at least one first cloud of devices having a first device type coupled to at least one second cloud of devices having a second device type via at least one border node, the at least one second cloud having at least one master node, by performing the acts of:
determining when the master node is idle; and
when the master node is idle:
responsive to the at least one border node transmitting one or more packets each having one of a plurality of format types, determining a format type of the last packet transmitted by the at least one border node; and
unlocking the first cloud if the format was not a prescribed format type.

2. The method of claim 1, where the prescribed format type comprises an Alpha format type.

3. The method of claim 1, where the plurality of format types comprise first, second, and third format types.

4. The method of claim 3, where the first format type comprises a legacy format type, and the first device type comprises a legacy device type.

5. The method of claim 4, where the second format type comprises a Beta format type, and the second device type comprises a Beta device type.

6. The method of claim 3, where the first format type comprises a Legacy format type which is compatible with the IEEE 1394-1995 standard using an IEEE 1394b PHY.

7. The method of claim 6, wherein the second format type comprises a Beta format type which is compatible with the IEEE 1394b standard using an IEEE 1394b PHY.

8. The method of claim 7, wherein the third format type comprises an Alpha format type which is compatible with the IEEE 1394-1995 standard using a data strobe link.

9. The method of claim 1, where the master node comprises a Bus Owner Supervisor Selector (BOSS) node.

10. The method of claim 9, wherein the method further comprises arbitrating for control of a bus if the BOSS node is idle and the last packet transmitted comprises an Alpha format packet.

11. The method of claim 10, where when said arbitration is successful, sending a null packet to the at least one first cloud.

12. The method of claim 10, where when said arbitration fails, repeating the last packet within the at least first cloud.

13. A non-transitory computer-readable medium that ensures compatibility in a data communications system between at least one first cloud of devices having a first device type coupled to at least one second cloud of devices having a second device type, via a border node, the computer-readable medium containing instructions which, when executed by a computer:
responsive to the transmission of a packet having one of a plurality of format types:
determine the format type of a most recent packet transmitted by the border node;
when the last packet transmitted by the border node was not of a prescribed format type, arbitrate for control of the second cloud;
determine whether arbitration is granted;
when arbitration is not granted, repeat the last packet within the second cloud only; and
when arbitration is granted, transmit a null packet to the first cloud, said null packet enabling transmissions within the first cloud.

14. The non-transitory computer readable-medium of claim 13, where the prescribed format type comprises an Alpha format type.

15. The non-transitory computer readable-medium of claim 13, where the plurality of format types comprise first, second, and third format types.

16. The non-transitory computer readable-medium of claim 13, where the first format type comprises a legacy format type, and the first device type comprises a legacy device type.

17. The non-transitory computer readable-medium of claim 16, where the second format type comprises a Beta format type, and the second device type comprises a Beta device type.

18. The non-transitory computer readable-medium of claim 13, where the first format type comprises a Legacy format type which is compatible with the IEEE 1394-1995 standard using an IEEE 1394b PHY.

19. The non-transitory computer readable-medium of claim 18, wherein the second format type comprises a Beta format type which is compatible with the IEEE 1394b standard using an IEEE 1394b PHY.

20. The non-transitory computer readable-medium of claim 19, wherein the third format type comprises an Alpha format type which is compatible with the IEEE 1394-1995 standard using a data strobe link.

21. A method for allowing device communication within a first cloud of devices having a first device type coupled to a second cloud of devices having a second device type via a border node, by performing the acts of:

receiving a plurality of packets at the border node, the plurality of packets comprising at least first packets of a first format and second packets of a second format;

responsive to the border node receiving one or more of said second data packets, locking the first cloud;

responsive to the border node receiving one or more of said first packets, unlocking the first cloud; and allowing one or more devices internal to the second cloud to freely transmit data packets within the second cloud, while the first cloud is locked.

22. The method of claim 21, where the first format type comprises a Legacy format type.

23. The method of claim 22, where the first device type comprises a Legacy device type.

24. The method of claim 21, where the second format type comprises a Beta format type.

25. The method of claim 24, where the second device type comprises a Beta device type.

26. The method of claim 21, where the first cloud comprises a Legacy cloud of Legacy devices which are compatible with the IEEE 1394-1995 standard using an IEEE 1394b PHY; and the second cloud comprises a Beta cloud of Beta devices which are compatible with the IEEE 1394b standard using an IEEE 1394b PHY.

27. The method of claim 26, where the act of unlocking the Legacy cloud comprises sending a null packet to the at least one Legacy cloud.

28. The method of claim 26, where the act of unlocking the Legacy cloud comprises:

extracting Legacy data from the second Legacy packet;

appending the Legacy data onto a third data packet; and identifying the third data packet as an end of data packet.

* * * * *